US012378914B2

(12) United States Patent
Mochrie

(10) Patent No.: US 12,378,914 B2
(45) Date of Patent: Aug. 5, 2025

(54) FUEL MANAGEMENT SYSTEM

(71) Applicant: ROLLS-ROYCE plc, London (GB)

(72) Inventor: Richard G Mochrie, Guildford (GB)

(73) Assignee: ROLLS-ROYCE plc, London (GB)

(*) Notice: Subject to any disclaimer, the term of this patent is extended or adjusted under 35 U.S.C. 154(b) by 45 days.

(21) Appl. No.: 18/166,308

(22) Filed: Feb. 8, 2023

(65) Prior Publication Data
US 2023/0279810 A1 Sep. 7, 2023

(30) Foreign Application Priority Data

Mar. 3, 2022 (GB) .................................... 2202946
Mar. 3, 2022 (GB) .................................... 2202947
Mar. 3, 2022 (GB) .................................... 2202948
Apr. 27, 2022 (GB) .................................... 2206111

(51) Int. Cl.
*F02C 7/224* (2006.01)
*F02C 7/14* (2006.01)
(52) U.S. Cl.
CPC ............... *F02C 7/224* (2013.01); *F02C 7/14* (2013.01); *F05D 2260/213* (2013.01)
(58) Field of Classification Search
CPC ....................................................... F02C 7/224
See application file for complete search history.

(56) References Cited

U.S. PATENT DOCUMENTS

| 3,486,458 | A | 12/1969 | Tyler |
| 3,779,007 | A | 12/1973 | Lavash |
| 5,116,362 | A | 5/1992 | Arline et al. |
| 5,438,823 | A * | 8/1995 | Loxley ...................... F02C 7/14 165/41 |
| 6,182,435 | B1 | 2/2001 | Niggemann et al. |
| 6,981,359 | B2 | 1/2006 | Wernberg et al. |

(Continued)

FOREIGN PATENT DOCUMENTS

| FR | 2992306 A1 | 12/2013 |
| GB | 1194041 A | 6/1970 |
| GB | 2 289 722 A | 11/1995 |

OTHER PUBLICATIONS

Nov. 16, 2023 U.S. Office Action issued in U.S. Appl. No. 18/166,285.
(Continued)

*Primary Examiner* — Lorne E Meade
*Assistant Examiner* — Alyson Joan Harrington
(74) *Attorney, Agent, or Firm* — Oliff PLC

(57) ABSTRACT

A fuel management system for a gas turbine engine. The fuel management system comprises a fuel supply line configured to supply fuel from an inlet to a combustor of the gas turbine engine. The fuel management system also includes a recirculation line extending from a recirculation point on the fuel supply line and configured to recirculate excess fuel from the fuel supply line for resupply to the fuel supply line. In addition, the fuel management system comprises a heat exchanger configured to reject heat from a thermal load of the gas turbine engine to fuel in the fuel management system. The heat exchanger is disposed on the fuel supply line upstream of the recirculation point or on the recirculation line. The fuel management system further comprises a fuel cooling device disposed along the recirculation line and configured to reject heat from the excess fuel therein.

7 Claims, 5 Drawing Sheets

(56) References Cited

U.S. PATENT DOCUMENTS

| | | |
|---|---|---|
| 7,185,485 B2 | 3/2007 | Lewis |
| 8,925,322 B2 | 1/2015 | Scully et al. |
| 10,752,374 B1 | 8/2020 | Lui et al. |
| 11,560,239 B2 | 1/2023 | Rambo et al. |
| 2003/0074884 A1 | 4/2003 | Snow et al. |
| 2012/0297780 A1 | 11/2012 | Bruno et al. |
| 2012/0312037 A1 | 12/2012 | Finney et al. |
| 2015/0323186 A1* | 11/2015 | Xu .................... F23R 3/283 60/785 |
| 2016/0230669 A1 | 8/2016 | Selstad et al. |
| 2016/0281656 A1 | 9/2016 | Alecu et al. |
| 2019/0277201 A1 | 9/2019 | Veilleux, Jr. et al. |
| 2020/0332714 A1* | 10/2020 | Ribarov .................... F02C 7/22 |
| 2020/0332716 A1* | 10/2020 | Ribarov .................. F02C 7/224 |
| 2021/0229827 A1 | 7/2021 | Doman |

OTHER PUBLICATIONS

Jan. 22, 2024 Notice of Allowance issued in U.S. Appl. No. 18/166,285.

Feb. 29, 2024 Office Action Issued U.S. Appl. No. 18/166,253.

Mar. 22, 2024 Notice of Allowance Issued in U.S. Appl. No. 18/166,268.

Jul. 10, 2023 extended Search Report issued in European Patent Application No. 23155255.5.

Jul. 10, 2023 extended Search Report issued in European Patent Application No. 23155253.0.

Jul. 10, 2023 extended Search Report issued in European Patent Application No. 23155251.4.

Jul. 10, 2023 extended Search Report issued in European Patent Application No. 23155250.6.

Sep. 1, 14, 2023 Office Action issued U.S. Appl. No. 18/166,268.

Sep. 30, 2022 Search Report issued in European Patent Application No. GB2206111.3.

Aug. 22, 2022 Search Report issued in European Patent Application No. GB2202948.2.

Aug. 22, 2022 Search Report issued in European Application No. GB2202947.4.

Jul. 28, 2022 Search Report issued in European Patent Application No. GB2202946.6.

U.S. Appl. No. 18/166,253, filed Feb. 8, 2023 on behalf of Richard G Mochrie.

U.S. Appl. No. 18/166,268, filed Feb. 8, 2023 on behalf of Richard G Mochrie.

U.S. Appl. No. 18/166,285, filed Feb. 8, 2023 on behalf of Richard G Mochrie.

Jun. 6, 2024 Office Action issued in U.S. Appl. No. 18/166,253.

* cited by examiner

FUEL MANAGEMENT SYSTEM

This disclosure claims the benefit of UK Patent Application No. GB 2206111.3, filed on 27 Apr. 2022, which is hereby incorporated herein in its entirety.

TECHNICAL FIELD

The present disclosure relates to a fuel management system for a gas turbine engine. It relates further to a gas turbine engine comprising a fuel management system and to an aircraft which includes a gas turbine engine comprising a fuel management system.

BACKGROUND

Fuel management systems are conventionally used for providing fuel to a gas turbine engine and for management of thermal loads. Fuel can be used as a heat sink into which heat from the thermal loads may be rejected prior to the fuel being provided to a combustor or a reheat of a gas turbine engine. Heat exchange apparatus is typically provided for the purpose of facilitating heat rejection from the thermal loads into the fuel within a fuel management system.

Known fuel management systems can be complex in nature, with a large mass or installation volume. It is therefore desirable to provide an improved fuel management system.

SUMMARY

According to a first aspect of the present disclosure, there is provided a fuel management system for a gas turbine engine, the fuel management system comprising: a fuel supply line configured to supply fuel from an inlet to a combustor of the gas turbine engine; a recirculation line extending from a recirculation point on the fuel supply line and configured to recirculate excess fuel from the fuel supply line for resupply to the fuel supply line; a heat exchanger configured to reject heat from a thermal load of the gas turbine engine to fuel in the fuel management system, wherein the heat exchanger is disposed on the fuel supply line upstream of the recirculation point or on the recirculation line; and a fuel cooling device disposed along the recirculation line and configured to reject heat from the excess fuel.

If the heat exchanger is located on the recirculation line, then it may be located upstream of the fuel cooling device.

The fuel cooling device may comprise a ram-air heat exchanger configured to reject heat from the excess fuel in the recirculation line to a flow of ram-air provided thereto.

It may be that the fuel management system comprises a fuel cooling device bypass line configured to receive fuel from the recirculation line and bypass the fuel cooling device; a temperature differential sensor configured to monitor a temperature differential parameter relating to a difference between a temperature of excess fuel within the recirculation line at a location upstream of the fuel cooling device and a temperature of the flow of ram-air; and a bypass controller configured to control a fuel cooling device bypass valve provided to the fuel cooling device bypass line so as to vary a fuel cooling device bypass flow rate of fuel received from the recirculation line and bypassing the fuel cooling device based on the monitored temperature differential parameter.

The bypass controller may be configured to control the fuel cooling device bypass valve so as to maximize the fuel cooling device bypass flow rate of fuel in response to a determination that the temperature of fuel at the location upstream of the fuel cooling device is lower than the temperature of the flow or ram-air.

It may be that the flow of ram-air is provided to the ram-air heat exchanger by a ram-air duct. The ram-air duct may be configured to be at least partially disposed within a gas turbine engine. The ram-air duct may be configured to receive ambient air from outside of the gas turbine engine. Otherwise, the ram-air duct may be configured to receive air from within the gas turbine engine, such as from a bypass duct of the gas turbine engine.

The fuel cooling device may include an evaporator of a refrigerant circuit configured to receive heat from fuel provided to the fuel cooling device. The fuel management system may comprise a fuel heating device including a condenser of the refrigerant circuit, the condenser being configured to reject heat into fuel provided to the fuel heating device. The fuel management system may also comprise: a cooled fuel sensor configured to monitor a cooled fuel temperature parameter relating to a temperature of excess fuel within the recirculation line downstream of the fuel cooling device; and a refrigerant circuit controller configured to control the refrigerant circuit based on the monitored cooled fuel temperature parameter to maintain the temperature of fuel downstream of the fuel cooling device within an excess fuel temperature target range. The excess fuel temperature target range may be from 0° C. to 10° C.

The fuel management system may further comprise a heated fuel sensor configured to monitor a heated fuel temperature parameter relating to a temperature of fuel within the fuel supply line downstream of the fuel heating device, and the refrigerant circuit controller may be configured to control the refrigerant circuit based on the monitored heated fuel temperature parameter to maintain the temperature of fuel downstream of the fuel heating device below a fuel temperature threshold value. The fuel temperature threshold value is between 160° C. and 180° C. The fuel heating device may be disposed along the fuel supply line downstream of the recirculation point for heat rejection into fuel upstream of the combustor.

It may be that the recirculation line is configured to recirculate the excess fuel to an external reservoir via an outlet of the fuel management system, for subsequent resupply to the fuel supply line via the external reservoir.

The fuel management system may further comprise a fuel flow controller configured to: receive an external reservoir signal relating to a temperature of fuel within the external reservoir; and control fuel flow in the fuel management system based on the external reservoir signal.

It may be that the recirculation line is configured to recirculate excess fuel from the fuel supply line to an engine-located fuel tank via the fuel cooling device for subsequent resupply to the fuel supply line. The fuel management system may comprise: an engine-located fuel tank sensor configured to monitor a temperature of fuel within the engine-located fuel tank; and a fuel flow controller configured to control fuel flow in the fuel management system based on the monitored temperature of fuel within the engine-located fuel tank.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
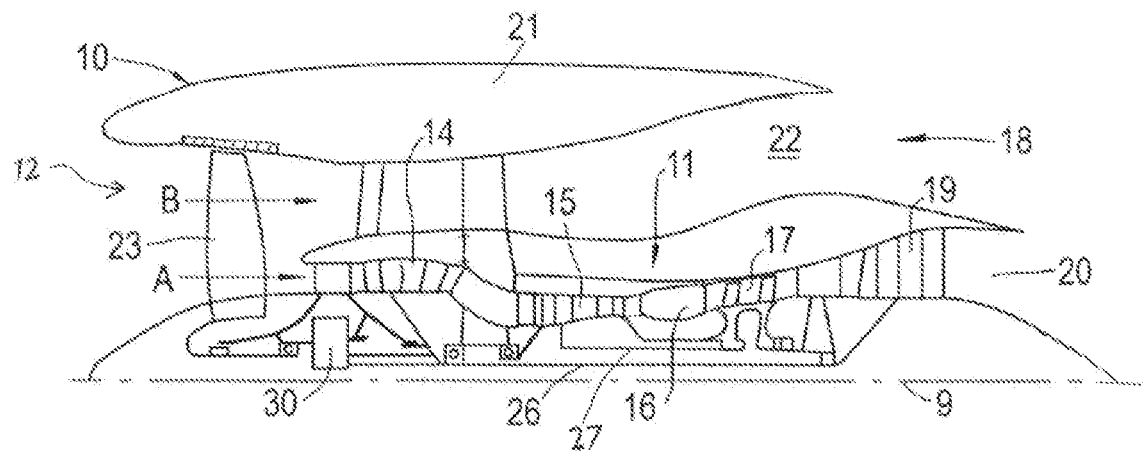
FIG. 1 shows a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustor 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
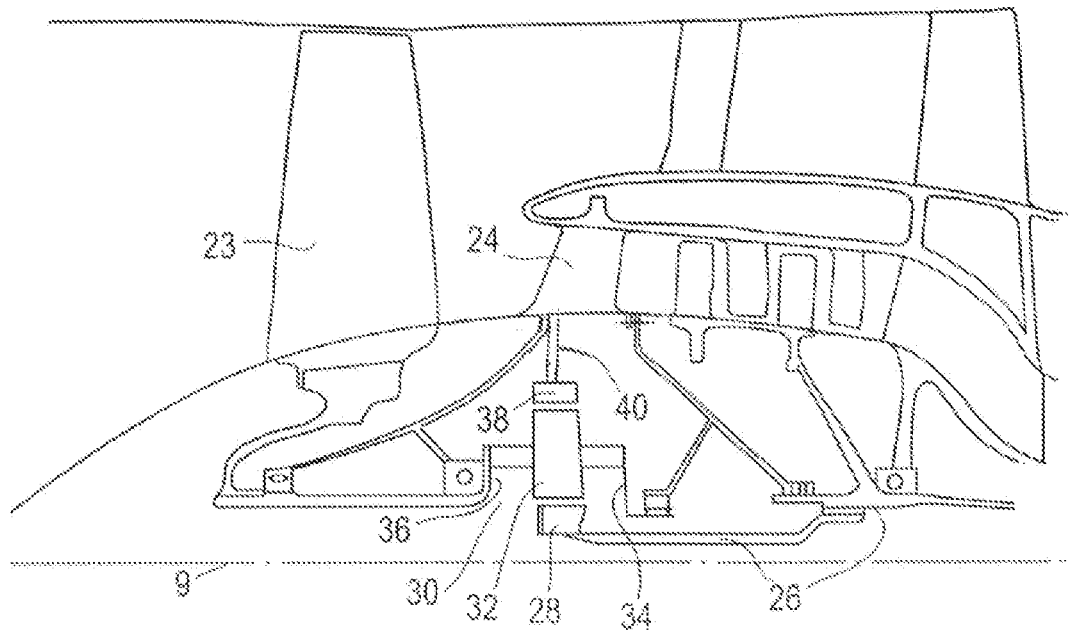
FIG. 2 shows a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
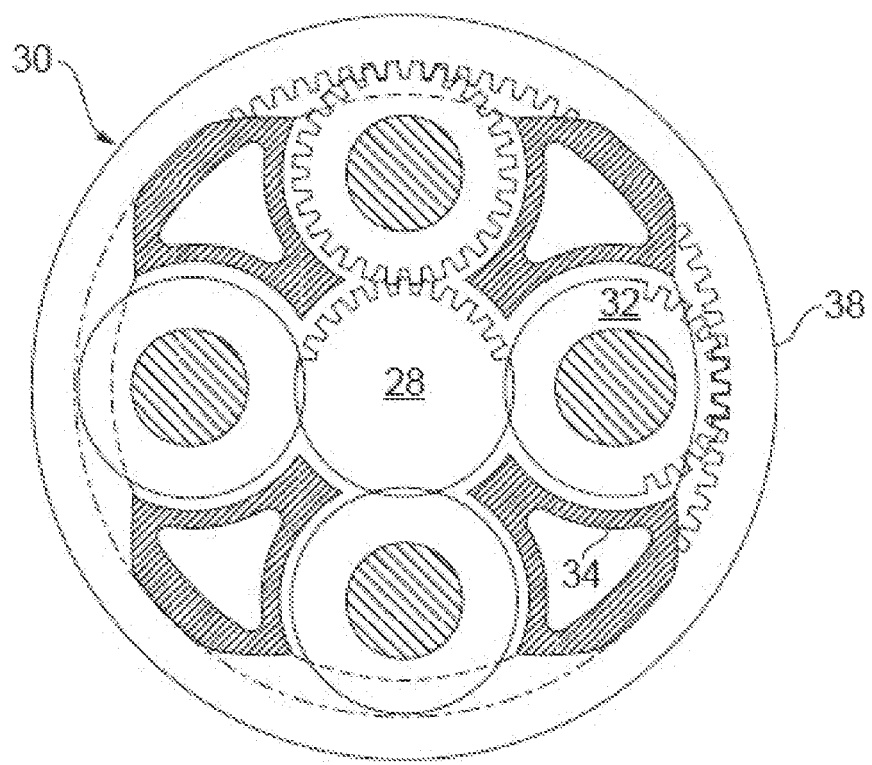
FIG. 3 shows a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
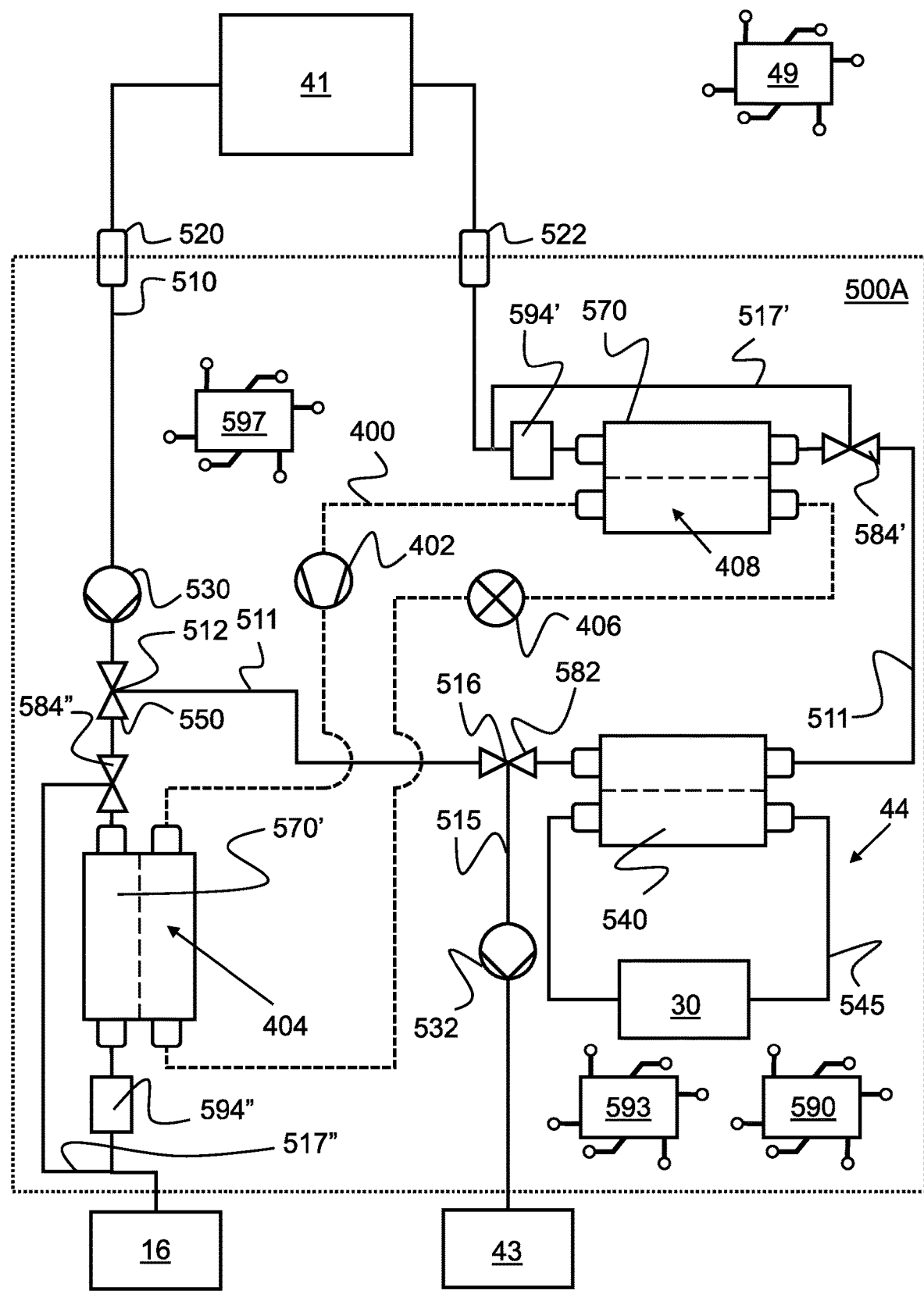
FIG. 4A shows a schematic view of a first example fuel management system.

FIG. 4A shows a schematic view of a first example fuel management system 500A for a gas turbine engine.

The fuel management system 500A comprises a fuel supply line 510 configured to supply fuel from a fuel management system inlet 520 to a combustor 16 of the gas turbine engine. The fuel supply line 510 is configured to receive fuel from an external reservoir 41 via the fuel management system inlet 520. The external reservoir 41 may be provided by, for example a fuel tank of an airframe to which the gas turbine engine is provided.

The fuel management system 500A comprises a recirculation line 511 configured to recirculate excess fuel (i.e. an excess portion of fuel) from the fuel supply line 510 for resupply to the fuel supply line 510. In the example of FIG. 4A, the recirculation line 511 extends from a recirculation point 512 on the fuel supply line 510 to a fuel management system outlet 522 for discharge to the external reservoir 41. The recirculation line 511 is therefore configured to recirculate the excess fuel from the fuel supply line 510 to the external reservoir 41 via the outlet 520 for subsequent resupply to the fuel supply line 510 via the external reservoir 41.

The fuel management system 500A comprises a heat exchanger 540 configured to reject heat from a thermal load 44 of the gas turbine engine to fuel in the fuel management system 500A, such that fuel within the fuel management system 500A provides cooling to the thermal load 44. In the example of FIG. 4A, the heat exchanger 540 is disposed on the recirculation line 511. The heat exchanger 540 is therefore configured to reject heat from the thermal load 44 of the gas turbine engine to excess fuel in the recirculation line 511. However, in other examples, it may be that the heat exchanger 540 is disposed elsewhere, such as on the fuel supply line 510 at a location upstream of the recirculation point 512.

The thermal load 44 is associated with a cooling demand which is to be met by cooling of the thermal load 44 by fuel within the fuel management system 500A. The cooling demand of the thermal load 44 is dependent on a thermal dissipation rate of the thermal load 44. The thermal dissipation rate of the thermal load 44 may vary continuously and/or discretely while the fuel management system 500A is in use, and so the cooling demand of the thermal load 44 may vary continuously and/or discretely while the fuel management system 500A is in use. It may be that the thermal dissipation rate of the thermal load 44 rapidly varies in use such that the fuel management system 500A is required to handle transient spikes in the cooling demand of the thermal load 44.

As shown in the example of FIG. 4, the thermal load 44 may comprise a process fluid circuit 545 which is configured to circulate a process fluid through the heat exchanger 540. The process fluid circuit 545 is configured to reject heat from the process fluid therein to fuel within the heat exchanger 540. As an example, the thermal load 44 may include a gearbox 30 of the gas turbine engine. The process fluid may be, for example, a lubricant provided to the gearbox 30 of the gas turbine engine.

The fuel management system 500A includes a fuel cooling device 570 disposed along the recirculation line 511. The fuel cooling device 570 is generally configured to reject heat from excess fuel in the recirculation line 511, as is described in further detail below.

The recirculation line 510 is therefore configured to recirculate excess fuel from the fuel supply line 510 such that fuel resupplied to the fuel supply line 510 has both cooled the thermal load 44 (i.e. received rejected heat from the thermal load 44) within the heat exchanger 540 and has been cooled itself by rejecting heat at the fuel cooling device 570. A temperature of fuel resupplied to the fuel supply line 510 is therefore reduced by the fuel cooling device 570, such that the fuel within the fuel management system 500A is more easily able to provide cooling to the thermal load 44 and therefore meet the cooling demand of the thermal load 44. In particular, the cooling of excess fuel within the recirculation line 511 by the fuel cooling device 570 provides that the fuel management system 500A is more capable of handling transient spikes in the cooling demand of the thermal load 44 by using relatively-lower temperature fuel provided by the fuel cooling device 570, instead of attempting to meet such a cooling demand by significantly increasing fuel flow rates within the fuel management system 500A.

In examples in which the heat exchanger 540 is disposed on the recirculation line 511, the fuel cooling device 570 is preferably located downstream of the heat exchanger 540 such that fuel resupplied to the fuel supply line 510 has both cooled the thermal load 44 (i.e. received rejected heat from the thermal load) within the heat exchanger 540 and has been subsequently cooled itself by rejecting heat at the fuel cooling device 570, as shown in the example of FIG. 4. This arrangement ensures that the temperature of excess fuel within the recirculation line 511 is highest prior to being cooled at the fuel cooling device 570, which may enable more effective heat rejection at the fuel cooling device 570. Nevertheless, in various examples according to this disclosure it may be that the fuel cooling device 570 is located upstream of the heat exchanger 540.

Fuel flow within the fuel management system 500A may be maintained and controlled using various example devices shown in FIG. 4A and described below.

The fuel management system 500A may comprise a fuel pump 530 disposed on the fuel supply line 510 such that fuel flow within the fuel supply line 510 is controllable by control of the fuel pump 530. In some examples, the fuel pump 530 may be configured to increase a pressure of fuel within the fuel supply line 510 and thereby pressurise fuel to a delivery pressure for the combustor 16.

It may be that the fuel management system 500A comprises a combustor valve 550 configured to control fuel flow in the fuel supply line 510 to the combustor 16 by selectively passing fuel to the combustor 16. The combustor valve 550 may selectively pass fuel to the combustor 16 by, for example, restricting fuel flow along the fuel supply line 510 and/or restricting fuel flow along the recirculation line 511. Fuel within the fuel supply line 510 which is not passed to the combustor 16 is directed into the recirculation line 511 by the combustor valve 550 such that fuel flow within the recirculation line is controllable by control of the combustor valve 550 and optionally the fuel pump 530 (in examples in which the fuel pump 530 is present).

The combustor valve 550 may be located at the recirculation point 512, as shown in the example of FIG. 4A. If so, the combustor valve 550 comprises a three-way valve which is configured to receive fuel from the supply line 510 to selectively direct fuel into the recirculation line 511 and to pass fuel to the combustor 16. In other examples the combustor valve 550 may be located downstream of the recirculation point 512 on the fuel supply line 510. In such examples, it may be that the combustor valve 550 comprises a two-port valve which is configured to restrict fuel flow to the combustor 16, such that excess fuel is directed into the recirculation line 511 at the recirculation point 512 upstream of the combustor valve 550. In yet further examples, the combustor valve 550 may be located downstream of the recirculation point 512 on the recirculation line 511. Similarly, in such examples, it may be that the combustor valve 550 comprises a two-port valve which is configured to restrict fuel flow along the recirculation line 511.

In the example of FIG. 4A, the fuel management system 500A includes a refrigerant circuit 400. The refrigerant circuit 400 includes a refrigerant fluid pathway through, in sequence, a compressor 402, a condenser 404, an expansion valve 406 and an evaporator 408 before returning to the compressor 402. The compressor 402 is generally configured to compress refrigerant fluid and to drive a flow of refrigerant fluid around the refrigerant circuit 400. In some examples according to the present disclosure, the compressor 402 may be configured to receive electrical power from an electrical power system of a gas turbine engine to which the fuel management system 500A is provided. The electrical power system of the gas turbine engine may comprise a generator mechanically coupled to a spool of the gas turbine engine. In other examples, the compressor 402 may be configured to receive mechanical power from a spool of a gas turbine engine to which the fuel management system 500A is provided. In such examples, the compressor 402 may be configured to be mechanically coupled to the spool of the gas turbine engine via a gearbox, such as a variable transmission.

In the example of FIG. 4A, the fuel cooling device 570 includes the evaporator 408, such that the evaporator is configured to receive heat from excess fuel provided to the fuel cooling device 570 by the recirculation line 511 into refrigerant fluid provided thereto. The refrigerant fluid is drawn through the compressor 402 and discharged to the condenser 404. The condenser 404 is configured to reject heat from the refrigerant fluid to a heat sink. Nevertheless, it will be appreciated that in other examples of the disclosure, the fuel management system may not comprise the refrigerant circuit 400 and the fuel cooling device 570 may not comprise the evaporator 408, as described below with respect to FIG. 4B.

The inclusion of the evaporator 408 of the refrigerant circuit 400 within the fuel cooling device 570 allows cooling provided to fuel within the recirculation line 511 to be readily and/or independently controlled. For example, the refrigerant circuit 400 may be operated to reject heat from excess fuel within the recirculation line 511 so as to precisely control a temperature of excess fuel downstream of the fuel cooling device 570, as is explained in further detail below. Otherwise, the refrigerant circuit 400 may be operated to reject heat from excess fuel within the recirculation line 511 while a gas turbine engine in which the fuel management system 500A is incorporated has a low airspeed or is stationary.

In various examples according to the disclosure, the condenser 404 is configured to reject heat from refrigerant fluid provided thereto into external air (e.g. ram-air). To this end, the condenser 404 may be disposed within an air heat exchanger such that the condenser 404 is configured to reject heat from refrigerant therein to air provided thereto such that external air serves as the heat sink. The air heat exchanger may be disposed within an air duct. The air duct may have any of the features described with respect to the ram-air duct discussed with reference to FIG. 4B below.

The fuel management system 500A may comprise a fuel heating device 570' which includes the condenser 404 such that the condenser 404 is configured to reject heat from refrigerant therein to fuel within the fuel management system 500A such that the fuel within the fuel management system 500A serves as the heat sink. Use of liquid fuel as the heat sink may provide more effective heat transfer between the refrigerant and the heat sink at the fuel heating device 570', which in turn improves an efficiency of the refrigerant circuit 400.

The fuel heating device 570' is disposed along the fuel supply line 510 downstream of the recirculation point 512 for heat rejection into fuel upstream of the combustor 16. This arrangement ensures that, in use, heat rejected into the fuel at the fuel heating device 570' is subsequently dissipated within the gas turbine engine as part of a combustion process facilitated by the combustor 16.

Figure 4B:
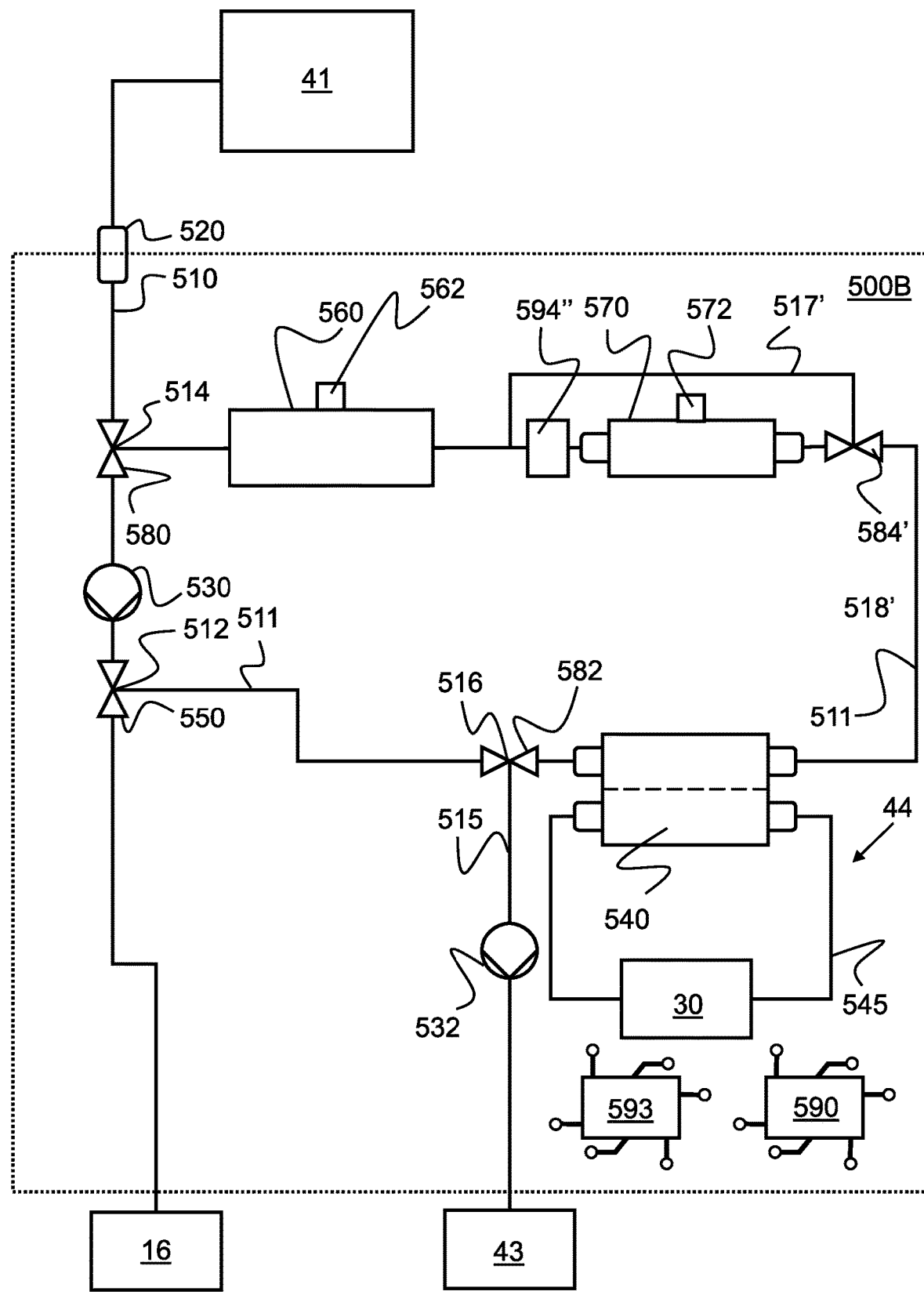
FIG. 4B shows a schematic view of a second example fuel management system.

The fuel management system 500A may comprise a cooling device bypass line 517' configured to receive fuel from the recirculation line 511 and to bypass the fuel cooling device 570, such that fuel passing through the cooling device bypass line 517' may be provided to fuel management system outlet 520 without having passed through the fuel cooling device 570 as shown in the example of FIG. 4A. In turn, the cooling device bypass line 517' is provided with a cooling device bypass valve 584' which is capable of varying a flow rate of fuel received from the recirculation line 511 into the cooling device bypass line 517'. Fuel received into the cooling device bypass line 517' may be referred to as cooling device bypass fuel. It will be appreciated that, in other examples of the disclosure, the cooling device bypass line 517' may be configured such that fuel passing through the cooling device bypass line 517' may be provided to, for instance, an engine-located fuel tank without having passed through the fuel cooling device 570, as shown in the example of FIG. 4B below.

Similarly, the fuel management system 500A may comprise a heating device bypass line 517" configured to receive fuel from the fuel supply line 510 and to bypass the fuel heating device 570", such that fuel passing through the heating device bypass line 517" may be provided to the combustor 16 of the gas turbine engine without having passed through the fuel heating device 570". In turn, the heating device bypass line 517" is provided with a heating device bypass valve 584" which is capable of varying a flow rate of fuel received from the fuel supply line 510 into the cooling device bypass line 517". Fuel received into the heating device bypass line 517" may be referred to as heating device bypass fuel.

The fuel management system 500A may comprise a bypass controller 593. The bypass controller 593 may be configured to control the flow rate of the cooling device bypass fuel by actuating the cooling device bypass valve 584'. Additionally or alternatively, the bypass controller 593 may be configured to control the flow rate of the heating device bypass fuel by actuating the heating device bypass valve 584".

In use, it may be that the refrigerant circuit 400 is unable to effectively function under certain operating conditions. The fuel management system 500A may comprise sensor apparatus configured to monitor various operating condition parameters relating to the operating conditions under of the refrigerant circuit 400. For example, it may be that fuel passing through the fuel cooling device 570 has a lower temperature than refrigerant within the fuel cooling device 570 and/or it may be that fuel passing through the fuel heating device 570' has a higher temperature than refrigerant within the fuel heating device 570'. If so, the refrigerant circuit 400 is unable to cool fuel passing through the fuel cooling device 570 and the fuel cooling device 570 may reject heat into the excess fuel in the recirculation line 511 such that a direction of heat transfer at the fuel cooling device 570 has been reversed. Similarly, the refrigerant circuit 400 may be unable to heat fuel passing through the fuel heating device 570' and the fuel heating device 570' may receive heat from fuel in the fuel management system 500A such that a direction of heat transfer at the fuel heating device 570' has been reversed.

The bypass controller 593 may be configured to receive a signal relating to the operating condition parameters of the refrigerant circuit 400 monitored by the sensor apparatus and to vary the flow rate of the cooling device bypass fuel and/or to vary the flow rate of the heating device bypass fuel based on the monitored operating condition parameters. For example, the bypass controller 593 may be configured to increase the flow rate of the cooling device bypass fuel and/or the flow rate of heating device bypass fuel in response to a determination that the operating condition of the refrigerant circuit 400 is indicative of the direction of heat transfer at the fuel heating device 570 and/or the fuel heating device 570' respectively has been reversed. This may prevent adverse heating and/or cooling of the refrigerant within the refrigerant circuit 400 and/or damage to the compressor 402.

The fuel management system 500A may comprise a refrigerant circuit controller 597. The refrigerant circuit controller 597 is configured to control the refrigerant circuit so as to control heat transfer at the condenser 404 and/or the evaporator 408. The refrigerant circuit controller 597 may control heat transfer at the condenser 404 and/or the evaporator 408 by controlling operation of the compressor 402 and/or the expansion valve 406. For example, in order to increase heat transfer at the condenser 404 and the evaporator 408, the refrigerant circuit controller 597 may increase an operating speed or a pressure ratio of the compressor 402 while varying a restriction to refrigerant flow provided by the expansion valve 406.

The fuel management system 500A may include a cooled fuel sensor 594' which is configured to monitor a cooled fuel temperature parameter which relates to a temperature of excess fuel within the recirculation line 511 downstream of the fuel cooling device 570. In examples in which the fuel management system 500A comprises the cooling device bypass line 517', the cooled fuel sensor 594' may be located between the fuel cooling device 570 and a point on the recirculation line 511 at which the cooling device bypass line 517' mixes fuel which has bypassed the fuel cooling device 570 with fuel in the recirculation line 511, as shown in FIG. 4A.

The refrigerant circuit controller 597 may be configured to control the refrigerant circuit 400 based on the monitored cooled fuel temperature parameter so as to maintain the temperature of fuel downstream of the fuel cooling device 570 within an excess fuel temperature target range. The excess fuel temperature target range may be chosen to provide sufficiently cool fuel for resupply to the fuel supply line 510 so as to increase a capacity of the fuel which is subsequently resupplied to the fuel supply line 510 to cool the thermal load 44 without overcooling excess fuel within the recirculation line 511. Overcooling of excess fuel within the recirculation line 511 may result in, for instance, formation of frozen crystals form within the excess fuel passing through the evaporator 408. For example, the fuel may comprise water which may form ice crystals if the fuel cooling device 570 overcools the excess fuel within the recirculation line 511 in use. Accordingly, the excess fuel temperature target range may be from 0° C. to 20° C. Preferably, the excess fuel temperature target range may be from 0° C. to 10° C.

Similarly, the fuel management system 500A may comprise a heated fuel sensor 594" configured to monitored a heated fuel temperature parameter which relates to a temperature of fuel within the fuel supply line 510 downstream of the fuel heating device 570'. As shown in FIG. 4A, in examples in which the fuel management system 500A comprises the heating device bypass line 517", the heated fuel sensor 594" may be located between the fuel heating device 570' and a point on the fuel supply line 510 at which the heating device bypass line 517" mixes fuel which has bypassed the fuel heating device 570" with fuel in the fuel supply line 510.

The refrigerant circuit controller 597 may be configured to control the refrigerant circuit 400 based on the monitored heated fuel temperature parameter so as to maintain the temperature of fuel downstream of the fuel heating device 570' below a fuel temperature threshold value. The fuel temperature threshold value may be chosen to reduce a risk of fuel coking or lacquering prior to delivery to the combustor 16. Accordingly, the fuel temperature limit threshold may be between 160° C. and 200° C. Preferably, the fuel temperature limit threshold may be between 160° C. and 180° C.

The fuel management system 500A may include a fuel flow controller 590. The fuel flow controller 590 is generally configured to control fuel flow within the fuel management system 500A, for example by actuating the fuel pump 530 and/or the combustor valve 550 as described above. The fuel flow controller 590 is configured to receive an external reservoir signal relating to a temperature of fuel within the external reservoir 41. The external reservoir signal may be received from, for example, a controller 49 of an airframe to which the fuel management system 500A is provided. The controller 49 may form part of an avionics system of the airframe. The fuel flow controller 590 is generally configured to control fuel flow within the fuel management system 500A based on the external reservoir signal.

As an example, the fuel flow controller 590 may be configured to increase a flow rate of excess fuel within the recirculation line 511 in response to a determination that the temperature of fuel within the external reservoir 41 is higher than a temperature to which the fuel cooling device 570 is able to cool fuel within the recirculation line 511. Increasing the flow rate of fuel within the recirculation line 511 causes relatively cool fuel to be flushed through the external reservoir 41 so as to reduce the temperature of fuel within the external reservoir 41. This effectively increases a store of cooling capacity for the fuel management system 500A in the form of relatively cool fuel within the external reservoir 41 until it is required to be used to meet the cooling demand of the thermal load 44. This may extend the period of time for which the store of cooling capacity in the form of relatively cool fuel within external reservoir may be used to dampen the impact of transient spikes in the cooling demand of the thermal load 44.

Optionally, the fuel management system 500A may comprise a reheat fuel supply line 515 which is configured to supply fuel from the fuel supply line 510 to a reheat 43 of the gas turbine engine via the recirculation line 511. In the example of FIG. 4A, the reheat fuel supply line 515 extends from a reheat branching point 516 on the recirculation line 511 to the reheat 43 via a reheat pump 532 and a reheat control valve 582. The reheat fuel supply line 515 is generally configured to extract a reheat portion of fuel from the recirculation line 511 and to provide the reheat portion of fuel to the reheat 43 of the gas turbine engine. In the example of FIG. 4A, a flow rate of the reheat portion of fuel may maintained by the reheat pump 532 and the reheat control valve 582. However, it will be appreciated that in other examples, the flow rate of the reheat portion of fuel is maintained by the reheat control valve 582 alone.

FIG. 4B shows a schematic view of a second example fuel management system 500B for a gas turbine engine. The second example fuel management system 500B is generally similar to the first example fuel management system 500A described above, with like reference numerals indicating common or similar features.

However, in contrast to the first example fuel management system 500A, in the second example fuel management system 500B the recirculation line 511 extends from a recirculation point 512 on the fuel supply line 510 to an engine-located fuel tank 560. From the engine-located fuel tank 560, the recirculation line 511 extends back to the fuel supply line 510 to provide fuel into the supply line 510 at a mixing point 514. The recirculation line 511 is therefore configured to recirculate the excess fuel from the fuel supply line 510 to the engine-located fuel tank 560 via the fuel cooling device 570 for subsequent resupply to the fuel supply line 510.

The fuel management system 500B is configured to mix fuel received from the external reservoir 41 and the engine-located fuel tank 560 at the mixing point 514 on the fuel supply line 510 such that the fuel supply line 510 is configured to receive fuel from the external reservoir 41 and/or from the engine-located fuel tank 560 (or selectively from only one of these, depending on an operating mode of the fuel management system). In the example of FIG. 4B, the fuel management system 500B comprises an input control valve 580 at the fuel mixing point 514, the input control valve 580 being configured to control mixing of fuel received into the fuel supply line 510 from the external reservoir 41 and from the engine-located fuel tank 560. The input control valve 580 may be a three-way valve, for example.

A temperature of fuel received by the fuel supply line 510 from the external reservoir 41 may be different to a temperature of fuel received by the fuel supply line 510 from the engine-located fuel tank 560 in use. In particular, the temperature of fuel received by the fuel supply line 510 from the external reservoir 41 may be generally higher than the temperature of fuel received by the fuel supply line 510 from the engine-located fuel tank 560. As the fuel supply line 510 is configured to selectively receive fuel the external reservoir 41 and/or from the engine-located fuel tank 560, the temperature of fuel received by the fuel supply line 510 may selectively be lower than if the fuel supply line 510 were only configured to receive fuel from the external reservoir 41, as shown in the example of FIG. 4A. Accordingly, the fuel management system may therefore be better able to accommodate transient spikes in the cooling demand of the thermal load 44.

In the example of FIG. 4B, the fuel cooling device 570 includes a ram-air heat exchanger such that the ram-air heat exchanger is configured to receive heat from excess fuel in the recirculation line 511 into a flow of ram-air provided thereto. The flow of ram-air may be provided to the ram-air heat exchanger by a ram-air duct. The ram-air duct may be configured to be at least partially disposed within a gas turbine engine to which the fuel management system is provided. The ram-air duct may be configured to receive ambient air from outside of the gas turbine engine. In particular, it may be that the ram-air duct is configured to receive air at a location upstream of a propulsive fan of the gas turbine engine. Otherwise, the ram-air duct may be configured to receive air from within the gas turbine engine, such as from a bypass duct of the gas turbine engine at a location downstream of a propulsive fan of the gas turbine engine.

It may be that the ram-air heat exchanger is configured to receive heat from excess fuel in the recirculation line 511 into the flow of ram-air provided thereto via an intermediary process medium such as a water-glycol mixture or solution. The ram-air heat exchanger may comprise an internal intermediary process loop configured to circulate the intermediary process medium for heat exchange with the excess fuel in the recirculation line 511 and the flow of ram-air within respective portions of the ram-air heat exchanger. Such an arrangement is associated with an improved safety of the fuel management system as a result of a reduction in a risk of fuel leakage into the flow of ram-air, which is in turn associated with a risk of combustion of fuel with the flow of ram-air within, for example, the ram-air duct.

In use, it may be that the ram-air heat exchanger is unable to reject heat from excess fuel in the recirculation line 511 into the flow of ram-air. For example, it may be that the ambient temperature of the flow of ram-air is sufficiently high that the excess fuel passing through the ram-air heat exchanger would be heated by the flow of ram-air rather the be cooled by the flow or ram-air. Under such conditions, the cooling device bypass line 517' enables at least a fraction of the excess fuel to be resupplied to the fuel supply line 510 without having been disadvantageously heated by the ram-air heat exchanger.

In the example of FIG. 4B, the fuel management system 500B comprises a temperature differential sensor 572 which is configured to monitor a temperature differential parameter which relates to a difference between a temperature of excess fuel within the recirculation line 511 at a location upstream of the fuel cooling device 570 and the temperature of the flow of ram-air.

The bypass controller 593 may be configured to control the cooling device bypass valve 584' so as to vary the flow rate of the cooling device bypass fuel based on the monitored temperature differential parameter. For instance, the bypass controller 593 may be configured to control the cooling device bypass value 584' to maximise the flow rate of the cooling device bypass fuel in response to a determination that the temperature of fuel at the location upstream of the fuel cooling device 570 is lower than the temperature of the flow of ram-air, and thereby allow at least a fraction of the excess fuel within the recirculation line 511 to be resupplied to the fuel supply line 510 without having been heated by the ram-air heat exchanger.

In the example of FIG. 4B, the fuel management system 500B comprises an engine-located tank sensor 562 configured to monitor a temperature of fuel within the engine-located fuel tank 560. The fuel flow controller 590 is configured to control fuel flow within the fuel management system 500B based on the monitored fuel temperature in the engine-located fuel tank 560. In the example of FIG. 4B, the fuel flow sensor may be configured to control fuel flow within the fuel management system 500B by actuating the fuel pump 530, the combustor valve 550 and/or the input control valve 580.

For example, the fuel flow controller 590 may be configured to increase a flow rate of excess fuel within the recirculation line 511 in response to a determination that the temperature of fuel within the engine-located fuel tank 560 is higher than a temperature to which the fuel cooling device 570 is able to cool fuel within the recirculation line 511. Increasing the flow rate of fuel within the recirculation line 511 causes relatively cool fuel to be flushed through the engine-located fuel tank 560 so as to reduce the temperature of fuel within the engine-located fuel tank 560, which effectively increases a store of cooling capacity for the fuel management system 500B in a similar way to that described above with respect to the example of FIG. 4A and the external reservoir 41.

It may be that the fuel management system comprises a tank bypass line configured to bypass the engine-located fuel tank 560, such that fuel passing through the tank bypass line may be provided to the mixing point 514 on the fuel supply line 510 without having passed through the engine-located fuel tank 560. The tank bypass line may extend from a tank bypass point on the recirculation line 511 between the fuel cooling device 570 and the engine-located fuel tank 560. In such examples, the fuel supply line 510 may receive fuel directly from the engine-located fuel tank 560 or from the tank bypass line when receiving fuel from the recirculation line 511. In addition, the tank bypass line may be provided with a tank bypass valve which is capable of varying a flow rate of fuel received from the fuel cooling device 570 into the tank bypass line. The fuel flow controller 590 may be configured to control the tank bypass valve and thereby control fuel flow within the fuel management system 500B.

As an example, in response to a determination that the temperature of fuel within the engine-located fuel tank 560 is greater than the temperature of fuel leaving the fuel cooling device 570, the fuel flow controller 590 may control the tank bypass valve to reduce the flow rate of the tank bypass portion of fuel (and therefore increase the flow rate of fuel through the engine-located fuel tank 560) so as to flush the engine-located fuel tank 560 with relatively cool fuel and thereby reduce the temperature of fuel within the engine-located fuel tank 560. This effectively increases a store of cooling capacity within the fuel management system 500B in the form of relatively cool fuel within the engine-located fuel tank 560 until it is determined to be needed.

As another example, in response to a determination that the temperature of fuel within the engine-located fuel tank 560 is lower than the temperature of fuel leaving the fuel cooling device 570 and that the cooling demand of the thermal load 44 is currently being met, the fuel flow controller 590 may control the tank bypass valve to increase the flow rate of the tank bypass portion of fuel and thereby increase the temperature of fuel received into the fuel supply line 510. This may effectively preserve the store of cooling capacity within the fuel management system 500 in the form of relatively cool fuel within the engine-located fuel tank 560 until it is determined to be needed as well as preventing fuel stagnation and/or fuel lacquering within the recirculation line 511.

According to the disclosure, the features and functionality described above with reference to any combination of the fuel flow controller 590, the bypass controller 593 and/or the refrigerant circuit controller 597 may be performed by any suitable control arrangement as will be apparent to those skilled in the art, such as using a different number of controllers or a single unified controller.

It should also be understood that a fuel management system in accordance with the principles of this disclosure may combine various features of the fuel management systems 500A and 500B described above. For example, the recirculation line could comprise more than one type of fuel cooling device, such as both a refrigerant circuit fuel cooling device and a ram air heat exchanger, so as to provide greater flexibility in cooling fuel. As another example, the recirculation line could be configured to be capable of returning fuel to either or both of an engine-located fuel tank and an external reservoir selectively dependent upon thermal management requirements.

Figure 5A:
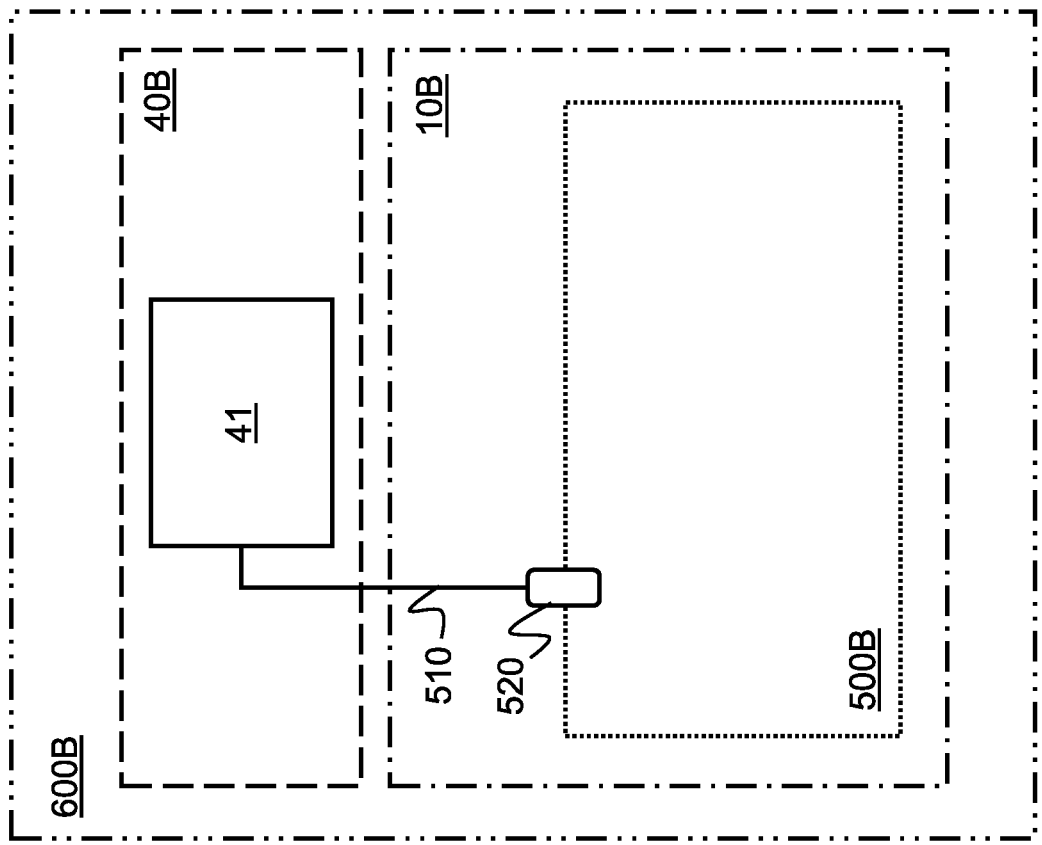
FIG. 5A shows a schematic view of a first example aircraft comprising the first example fuel management system shown by FIG. 4A.

FIG. 5A shows a highly schematic view of a first example aircraft 600A comprising a gas turbine engine 10A and an airframe 40A. The gas turbine engine 10A comprises a fuel management system 500A in accordance with the examples described above with respect to FIG. 4A. The airframe 40A comprises an airframe-located fuel tank 41 which provides the external reservoir for the fuel supply line 510 and the recirculation line 511 via the fuel management system outlet 520 and the fuel management system inlet 520 respectively.

Figure 5B:
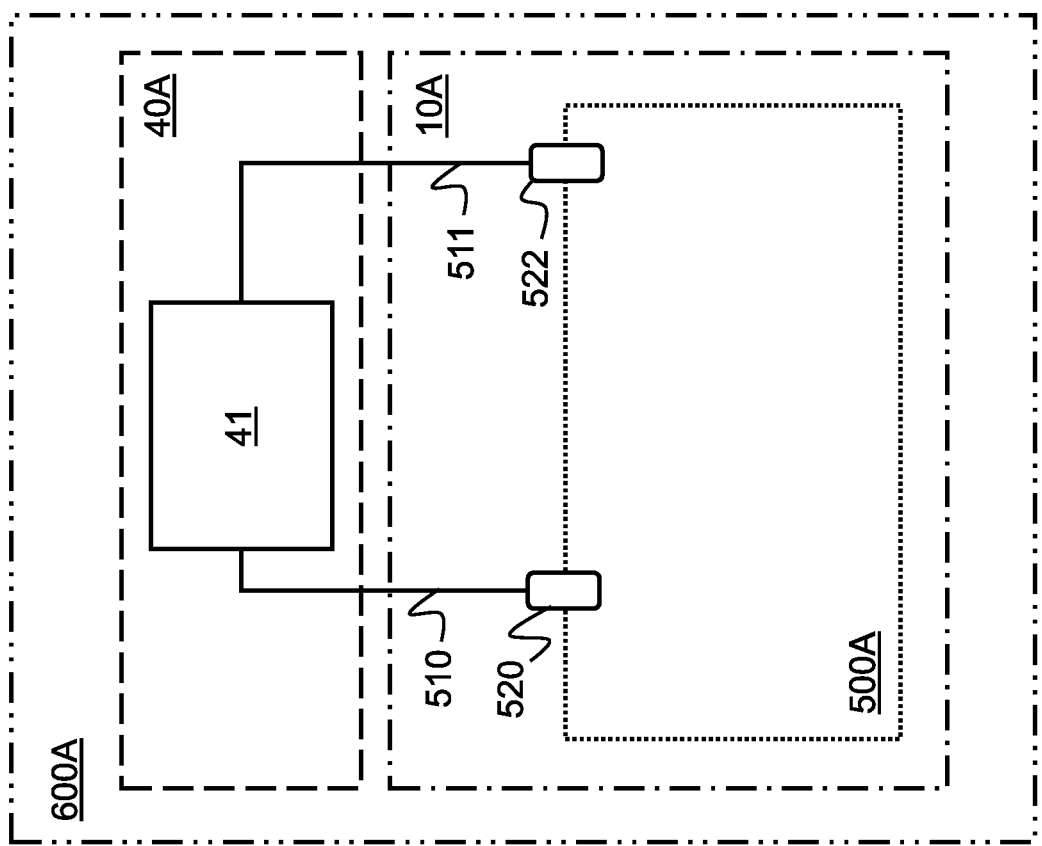
FIG. 5B shows a schematic view of a second example aircraft comprising the second example fuel management system shown by FIG. 4B.

FIG. 5B shows a highly schematic view of a first example aircraft 600B comprising a gas turbine engine 10B and an airframe 40B. The gas turbine engine 10B comprises a fuel management system 500B in accordance with any of the examples described above with respect to FIG. 4B. The airframe 40B comprises an airframe-located fuel tank 41 which provides the external reservoir for the fuel supply line 510 via the fuel management system inlet 520.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

What is claimed is:

1. A fuel management system for a gas turbine engine, the fuel management system comprising:

a fuel supply line configured to supply fuel from an inlet to a combustor of the gas turbine engine;

a recirculation line extending from a recirculation point on the fuel supply line and configured to recirculate excess fuel from the fuel supply line for resupply to the fuel supply line;

a heat exchanger configured to reject heat from a thermal load of the gas turbine engine to the excess fuel, wherein the heat exchanger is disposed on the recirculation line at a first position that is downstream of the recirculation point and upstream of the fuel supply line;

a fuel cooling device including an evaporator of a refrigerant circuit configured to receive heat from the excess fuel provided to the fuel cooling device, the fuel cooling device is disposed at a second position along the recirculation line, the second position being downstream of the first position and upstream of the fuel supply line such that the excess fuel within the recirculation line is first heated in the heat exchanger and is then cooled in the fuel cooling device before being returned to the fuel supply line; and a fuel heating device including a condenser of the refrigerant circuit, wherein the condenser is configured to reject heat into the fuel provided to the fuel heating device, the fuel heating device is disposed on the fuel supply line between the recirculation point and the combustor.

2. The fuel management system according to claim 1, further comprising:

a cooled fuel sensor configured to monitor a cooled fuel temperature parameter relating to a temperature of the excess fuel within the recirculation line downstream of the fuel cooling device; and a refrigerant circuit controller configured to control the refrigerant circuit based on the monitored cooled fuel temperature parameter to maintain the temperature of the excess fuel downstream of the fuel cooling device within an excess fuel temperature target range.

3. The fuel management system according to claim 2, wherein the excess fuel temperature target range is from 0° C. to 10° C.

4. The fuel management system according to claim 2, further comprising a heated fuel sensor configured to monitor a heated fuel temperature parameter relating to a temperature of the fuel within the fuel supply line downstream of the fuel heating device, wherein the refrigerant circuit controller is configured to control the refrigerant circuit based on the monitored heated fuel temperature parameter to maintain the temperature of the fuel downstream of the fuel heating device below a fuel temperature threshold value.

5. The fuel management system according to claim 4, wherein the fuel temperature threshold value is between 160° C. and 180° C.

6. The fuel management system according to claim 1, wherein the recirculation line is configured to recirculate the excess fuel to an external reservoir via an outlet of the fuel management system, for subsequent resupply to the fuel supply line via the external reservoir.

7. The fuel management system according to claim 6, comprising a fuel flow controller configured to:

receive an external reservoir signal relating to a temperature of fuel within the external reservoir; and control fuel flow in the fuel management system based on the external reservoir signal.

* * * * *